Aug. 5, 1969 L. A. TANNER 3,460,034
COMPARATOR FOR DETERMINING BOTH THE MAGNITUDE AND THE SENSE
OF DIFFERENCE IN THE FREQUENCIES OF TWO SIGNALS
Filed July 30, 1965
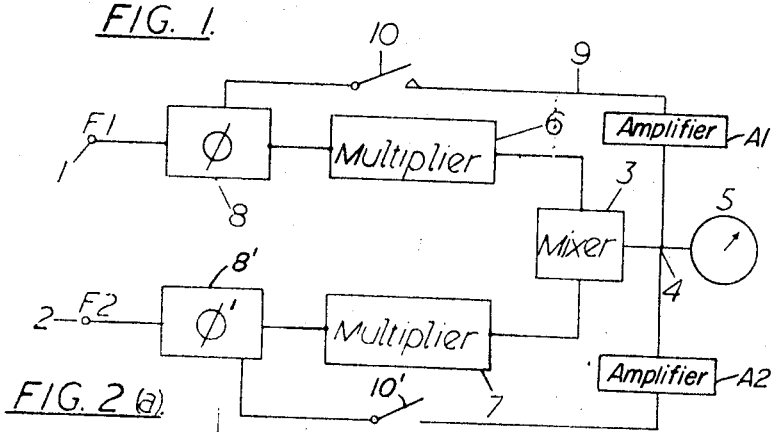
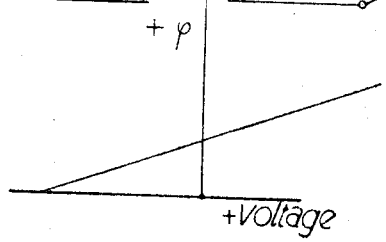
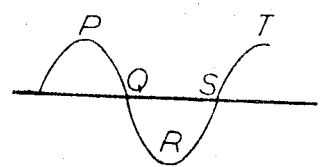
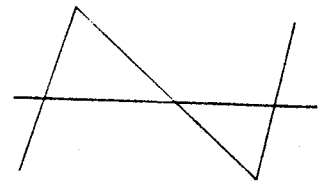
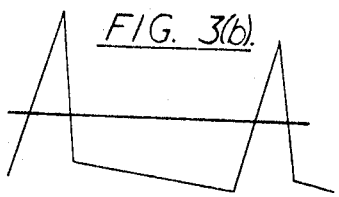
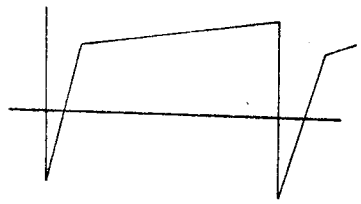

United States Patent Office 3,460,034
Patented Aug. 5, 1969

3,460,034
COMPARATOR FOR DETERMINING BOTH THE MAGNITUDE AND THE SENSE OF DIFFERENCE IN THE FREQUENCIES OF TWO SIGNALS
Leslie A. Tanner, Aldwych, London, England, assignor to International Standard Electric Corporation, New York, N.Y., a corporation of Delaware
Filed July 30, 1965, Ser. No. 476,085
Claims priority, application Great Britain, Sept. 4, 1964, 36,339/64
Int. Cl. G01r 23/14
U.S. Cl. 324—79                    4 Claims

ABSTRACT OF THE DISCLOSURE

A circuit is provided to indicate both the magnitude and the sense of the frequency difference between two signals. In the circuit, the two signals are mixed and a conventional beat detector is used to provide an indication of beat frequency and thereby the magnitude of the difference. A variable phase modulator is placed in series with the circuit over which one signal is received and the phase is shifted by feedback from output of the mixer. The output of the mixer is asymmetric with the polarity of the mean current, depending upon which signal has the higher frequency.

---

This specification relates to frequency comparators for electric waves.

When comparing the frequency of the two independent signal sources having only slightly different frequencies it is often necessary to know directly not only the amount, but also the sense of the frequency deviation.

Although it is very easy to measure directly the frequency difference of the two sources by applying both signals to a mixer, generating therein a beat frequency signal and counting or otherwise indicating the number of beats per second it is difficult to determine which of the two sources has the higher frequency particularly when the frequency of the sources cannot be altered or when the provision of a reference source is undesirable. The use of delay lines, oscilloscopes and reference oscillators is expensive and the results are difficult to interpret particularly if the frequency difference exceeds a few cycles a second.

According to the invention there is provided a circuit for comparing the frequency of two electric waves comprising a mixer to which the said waves are applied, means connected to an output of said mixer to indicate the magnitude of the frequency deviation between the two waves, a phase modulator connected in the path of at least one of the waves applied to said mixer and a feedback path between the mixer output and a control terminal of said phase modulator to control the magnitude of phaseshift introduced by said modulator in response to variations of output from the mixer.

The invention will now be described with reference to the accompanying drawings in which:

FIG. 1 shows in block schematic form an embodiment of a comparator according to the invention, FIGS. 2 and 3 are vector diagrams and waveshapes to explain the operation of the comparator.

The two signals to be compared having frequencies $F_1$ and $F_2$ are connected to terminals 1 and 2 shown in FIG. 1. These signals are applied to the mixer 3 and a signal at the beat frequency $(F_1-F_2)$ or $(F_2-F_1)$ is obtained in the output circuit 4 to which is connected a suitable indicating instrument 5. This instrument will give the magnitude of the frequency deviation, but it will not indicate which of the two signals has the higher frequency.

In order to increase the sensitivity of the comparator or reduce the time necessary to perform a frequency comparison to a given degree of accuracy it is known to include frequency multipliers 6 and 7 having equal multiplying factors in the paths connecting terminals 1 and 2 to the mixer 3.

It has been stated above that the main difficulty of determining whether $F_1>F_2$ or $F_2>F_1$ arises when it is impossible to alter the frequency of either signal. In the present comparator use is made of the fact that although for some reason it may be impossible to alter the frequency of a source it is possible to alter the phase of a signal produced by that source. For this purpose a phase modulator 8 is included between one of the input terminals of the comparator and the mixer, but preferably in front of the multiplier, if such is used. The phase shift introduced into the path of signal at frequency $F_1$ can be varied by the magnitude of a control signal applied to the phase modulator via lead 9. This control signal is taken from the output circuit 4 of the mixer 3 so that the phaseshift introduced by modulator 8 is periodically advanced and retarded in response to the voltage at point 4.

Various methods of advancing and retarding the phase of a signal in response to the variation of a control signal are known and will therefore not be described.

To explain the operation of the comparator it will be assumed that the phase modulator has a control voltage-phaseshift characteristic shown in FIG. 2a from which it is seen that the application of a positive going voltage to the control lead 9 of the modulator will advance the phase of the signal going through the modulator and a negative going signal will retard it. When the switch 10 is open the signal at point 4 will be a sinusoidal beat shown in FIG. 2b having a negative going portion PQR and a positive going portion RST. If, as an example, it is assumed that frequency $F_1>F_2$ and that switch 10 is closed it will be clear that during the positive going part of the beat signal the phase of the signal of frequency $F_1$ will be advanced, i.e., its instantaneous frequency will be increased relative to signal of frequency $F_2$. The frequency of the beat signal at point 4 will therefore increase, i.e., the steepness of the curve at points Q and S will also increase. Conversely when the control signal applied to the modulator is negative going the signal of frequency $F_1$ will suffer a phase retardation, i.e., its instantaneous frequency will decrease. As a result the frequency of the beat signal of FIG. 2b and the slope of the curve will be reduced. The action of the path 9 is to introduce positive feedback when the beat signal is positive going and negative feedback when the beat signal is negative going. As a consequence of the periodic reversal of the sign of the feedback as the vectors representing the two signals applied to the comparator drift from the "in phase" to the "phase opposition" position, the waveshape of the signal at the output of the mxer will no longer be sinusoidal but will tend to become as is shown in FIG. 3a, or as shown in FIG. 3b if the amount of feedback is increased for example by providing an amplifier A1, in the feedback path 9.

In the above explanation it was assumed that frequency $F_1>F_2$. If the same reasoning is applied to the case where $F_1<F_2$ it will be found that the waveshape of the signal at the output of the mixer will be reversed as is shown in FIG. 3c. The wave shapes shown in FIGS. 3b and 3c are not symmetrical about the time axis, therefore the mean values of the two curves will have opposite signs. If indicator 5 shown in FIG. 1 is a centre zero instrument and gives deflections depending on the mean value of the current, the direction of the deflection will indicate whether $F_1$ is greater or smaller than $F_2$.

The sensitivity of the comparator according to FIG. 1 can be increased by providing a second phase modulator 8' in the path connected to terminal 2 and arranging its control voltage-phaseshift characteristic, over a second feedback path 9' including an amplifier A2 and a switch 10', to have an opposite sign to that connected to terminal 1, thereby doubling the differential phaseshift between the two signals for a given control signal.

If the frequency difference between $F_1$ and $F_2$ does not exceed a few cycles per second the same meter will indicate the magnitude of the frequency difference (when switch 10 is open) and the sense of the deviation (when switch 10 is closed). When the frequency difference between $F_1$ and $F_2$ is relatively high, for example several hundred cycles per second, the conventional beat indicator, due to the inertia of the meter movement would no longer furnish an indication so that it might be wrongly assumed that the beat difference is zero. In the comparator of the invention with the feedback loop closed an indication of the sense of the deviation would be obtained even when the beat frequency is of the order of several hundred cycles per second.

The indicating instrument 5 shown in FIG. 1 can of course be replaced by other known indicating or recording means. For example the magnitude of the deviation could be obtained from a frequency measuring device connected to point 4 in the output circuit of the mixer in place of the meter 5. Similarly the indication of the sense of the deviation could be by means of lamps which are switched on or off depending on the polarity of spikes appearing in the output of the mixer.

What we claim is:

1. A comparator for comparing the frequency of two electric waves comprising a mixer to which the said waves are applied over prepared paths, means connected to an output of said mixer to indicate the magnitude of the frequency deviation between the two waves, a phase modulator is included in the path of each of the waves applied to said mixer and to be compared, a feedback path is provided between the mixer output and a control terminal of each phase modulator to control the magnitude of phaseshift introduced by said modulator in response to variations of output from the mixer, and the polarity of the feedback applied to said modulators is chosen to alter the phase of the said signals in opposite directions.

2. A comparator as claimed in claim 1 in which the feedback path includes an amplifier.

3. A comparator as claimed in claim 2 in which the feedback path may be opened by means of a switch.

4. A comparator as claimed in claim 3 in which said indicating means shows the magnitude of the frequency deviation when the switch is open and the sense of the deviation when the switch is closed.

References Cited

UNITED STATES PATENTS 2,855,456 10/1958 Morrison.
3,092,719 6/1963 Bravenec _____ 324—79 X RUDOLPH V. ROLINEC, Primary Examiner P. F. WILLE, Assistant Examiner U.S. Cl. X.R.

328—133